United States Patent [19]

Injeyan et al.

[11] Patent Number: 5,825,791
[45] Date of Patent: Oct. 20, 1998

[54] VARIABLE COHERENCE LENGTH HIGH BRIGHTNESS LASER ARCHITECTURE

[75] Inventors: Hagop Injeyan, Glendale; Lawrence J. Lembo, Torrance; Randall J. St. Pierre, Santa Monica; Marcy M. Valley, Los Angeles, all of Calif.

[73] Assignee: TRW Inc., Redondo Beach, Calif.

[21] Appl. No.: 520,349

[22] Filed: Aug. 28, 1995

[51] Int. Cl.$^6$ ........................................................ H01S 3/10
[52] U.S. Cl. .................. 372/26; 372/12; 372/82; 372/92; 372/98; 372/27; 372/28
[58] Field of Search ......................... 372/26, 32, 12, 372/82, 92, 108, 98, 37, 28, 106

[56] References Cited

U.S. PATENT DOCUMENTS

| | | | |
|---|---|---|---|
| 3,764,936 | 10/1973 | Baues | 331/94.5 |
| 4,410,992 | 10/1983 | Javan | 372/32 |
| 5,038,359 | 8/1991 | Pepper et al. | 372/99 |
| 5,048,029 | 9/1991 | Skupsky et al. . | |
| 5,082,376 | 1/1992 | Beylat et al. | 385/3 |
| 5,088,105 | 2/1992 | Scifres et al. | 372/92 |
| 5,126,876 | 6/1992 | O'Meara | 359/338 |
| 5,136,598 | 8/1992 | Weller et al. | 372/26 |
| 5,136,599 | 8/1992 | Wilcox | 372/32 |
| 5,157,542 | 10/1992 | Fitzmartin et al. | 359/278 |
| 5,212,698 | 5/1993 | Kafka et al. | 372/18 |
| 5,267,011 | 11/1993 | Callender | 356/5 |
| 5,272,513 | 12/1993 | Vahala et al. | 356/28.5 |
| 5,276,696 | 1/1994 | Callender | 372/32 |
| 5,289,252 | 2/1994 | Nourrcier | 356/5 |
| 5,309,473 | 5/1994 | LEE | 372/99 |
| 5,339,183 | 8/1994 | Suzuki | 359/123 |
| 5,347,392 | 9/1994 | Chen et al. . | |
| 5,347,525 | 9/1994 | Faris | 372/19 |

FOREIGN PATENT DOCUMENTS 0503579  3/1992  European Pat. Off. .

Primary Examiner—Leon Scott Jr.
Attorney, Agent, or Firm—Michael S. Yatsko

[57] ABSTRACT

A high power laser source having a preselected broad bandwidth, including a master oscillator providing a single-mode laser beam, a resonant electro-optical modulator and a source of radio-frequency (rf) modulation voltage, to produce a modulator output beam having sidebands spaced on each side of the nominal frequency of the single-mode laser beam. The bandwidth and the number of modes may be varied by controlling the voltage applied to the modulator. At least one additional modulator in series with the first provides for the addition of other sidebands overlaying those generated with just one modulator. In another embodiment of the invention, the modulator is installed in a PC MOPA (phase conjugated master oscillator power amplifier) configuration to provide modulation only on the return path of the beam from a phase conjugation device having a stimulated Brillouin scattering (SBS) medium. Because the electro-optical modulator is sensitive to polarization direction, it can be oriented to be effective only for the return beam, which has a different direction of polarization from that of the single-mode laser beam, thus optimizing the performance of the SBS medium.

8 Claims, 3 Drawing Sheets

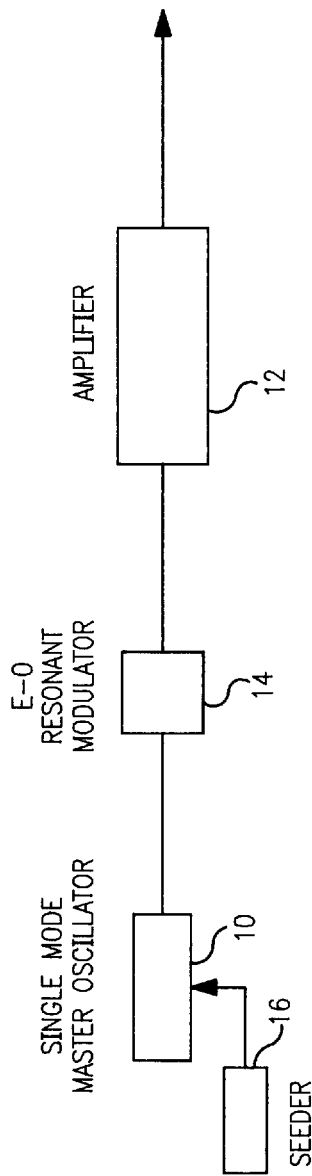
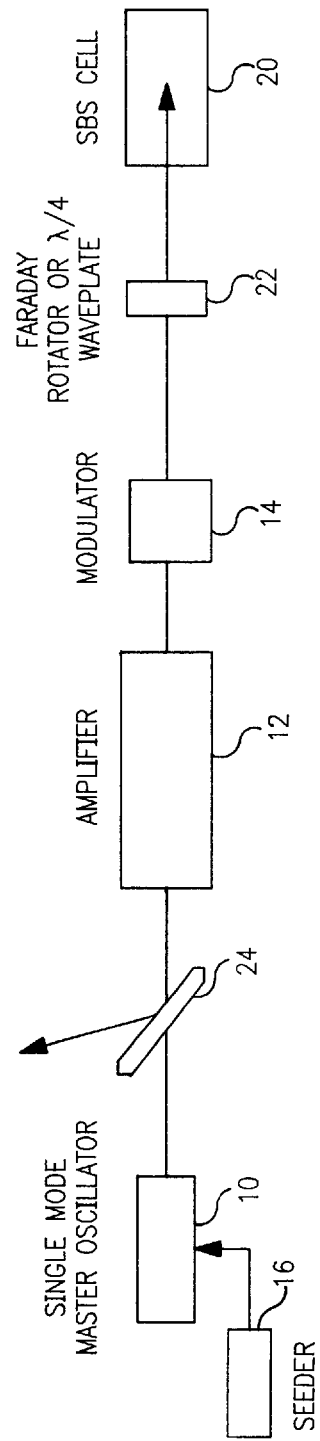

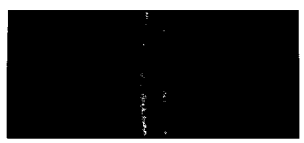
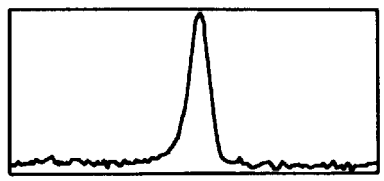
FIG. 5A
SINGLE FREQUENCY
RF POWER=0 WATTS
FIG. 5B
BANDWIDTH=3 GHz
RF POWER=2 WATTS
FIG. 5C
BANDWIDTH=5 GHz
RF POWER=3 WATTS
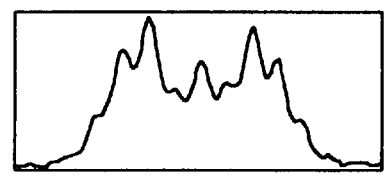
FIG. 5D
BANDWIDTH=7 GHz
RF POWER=5 WATTS
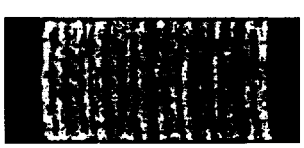
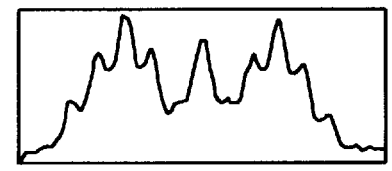
FIG. 5E
BANDWIDTH=9 GHz
RF POWER=7 WATTS
FIG. 5F
BANDWIDTH=11 GHz
RF POWER=10 WATTS

VARIABLE COHERENCE LENGTH HIGH BRIGHTNESS LASER ARCHITECTURE

BACKGROUND OF THE INVENTION

This invention relates generally to high power, high brightness lasers and, more particularly, to broad bandwidth high power, solid-state lasers with good beam quality. In many applications lasers are required to emit coherent, monochromatic light, but some applications of lasers, such as imaging applications, have a need for a laser source that emits light over a broader band of frequencies.

It is known that phase modulation of a laser beam generates frequency sidebands that can be used to carry information on the beam. It has also been suggested that phase modulation be used not simply to encode information on a beam but to broaden its bandwidth for use in applications that require less coherent light. U.S. Pat. No. 5,136,599 to Wilcox discloses a cross-phase modulation technique for this purpose. Two light beams of slightly different frequencies are coupled into a length of polarization-preserving optical fiber. The Wilcox patent specification points out that a more conventional modulation approach, using electro-optical crystals cannot easily achieve large bandwidths and high modulation frequencies. These shortcomings arise, in part, because conventional electro-optical modulators operate at high voltages and there are practical limitations to the frequency at which such voltages can be switched to achieve modulation. The cross-modulation approach taught by Wilcox avoids these difficulties but has its own inherent limitations. Specifically, the optical fiber significantly limits the aperture of the beam and limits its energy to only a few millijoules. Therefore, neither conventional electro-optical modulation nor cross-modulation in an optical fiber can be used in an application requiring a beam with broad bandwidth, relatively high power and a large aperture.

Another problem associated with broad bandwidth laser sources is that they have proved to be difficult to adapt to a PC MOPA (phase conjugated master oscillator power amplifier) configuration. For higher laser source output powers, the PC MOPA configuration is often used. A master oscillator generates a high quality beam of relatively low power, which is amplified on two successive passes through an amplifier. The beam is reflected from a phase conjugation cell between the first and second passes through the amplifier. The well known phase conjugation process provides a convenient technique for cancelling wavefront distortions resulting from passage of the beam through the amplifier. A commonly used phase conjugation cell operates on the principle of stimulated Brillouin scattering (SBS). Unfortunately, for reasons that have not been completely understood, an SBS cell does not function well when the beam has a broad bandwidth.

It will be appreciated from the foregoing that there is still a need for a high power, large aperture, laser source having a broad bandwidth and low coherence length. Ideally, the laser source must be capable of operating in a PC MOPA configuration. The present invention fulfills these needs.

SUMMARY OF THE INVENTION

The present invention resides in a broad bandwidth laser source capable of operating at high powers and having a relatively large aperture. Briefly, and in general terms, the laser source of the invention comprises a master oscillator providing a single-mode laser beam at a selected nominal frequency; a resonant electro-optical modulator positioned to receive the laser beam; and a source of radio-frequency (rf) modulation voltage coupled to the modulator. The modulator produces an output beam having sidebands spaced on each side of the nominal frequency, and having a lower coherence length than the single-mode laser beam. The laser source may also include an amplifier positioned in the path of the output beam, to amplify the energy of the output beam.

Preferably, the source of rf modulation voltage is adjustable to vary the number of sidebands and overall bandwidth of the output beam. The laser source may also include an additional electro-optical modulator connected optically in series with the first-recited modulator; and an additional source of rf modulation voltage connected to the additional electro-optical modulator and having a frequency less than that of the first-recited source of rf modulation voltage. The additional electro-optical modulator provides additional sidebands at smaller frequency intervals than those provided by the first-recited modulator.

The invention may also be defined as a PC MOPA laser source, comprising a master oscillator providing a single-mode laser beam at a nominal frequency and with a first linear polarization direction; an amplifier positioned to receive and amplify the laser beam from the master oscillator; a resonant electro-optical modulator positioned to receive the amplified laser beam; a source of radio-frequency (rf) modulation voltage coupled to the modulator; and a phase conjugation device positioned to receive the amplified laser beam and reflect it in phase conjugate form. The laser source also includes optical means positioned between the modulator and the phase conjugation device, for rotating the direction of polarization by 90° as result of two passes of the laser beam; and a polarizer positioned between the master oscillator and the amplifier, to outcouple the return beam from the laser source. The modulator is oriented to be effective in modulating only the return pass of the beam, and the modulator produces an output beam having sidebands spaced on each side of the nominal frequency, and having a lower coherence length than the single-mode laser beam. In the illustrative embodiment, the optical means includes a quarter-wave plate, for converting the linearly polarized laser beam on its first pass to a circularly polarized beam, and for converting the circularly polarized beam back into a linearly polarized beam on the return pass. As mentioned earlier, the source of rf modulation voltage is preferably adjustable to provide a selected bandwidth for the output beam.

The laser source may also include an additional electro-optical modulator connected optically in series with the first-recited modulator; and an additional source of rf modulation voltage connected to the additional electro-optical modulator and having a frequency less than that of the first-recited source of rf modulation voltage. The additional electro-optical modulator provides additional sidebands at smaller frequency intervals than those provided by the first-recited modulator.

It will be appreciated from the foregoing that the present invention represents a significant advance in the field of broadband laser sources. In particular, the invention provides a broadband laser source of high power and large aperture, suitable for operation alone or in conjunction with a PC MOPA configuration. Other aspects and advantages of the invention will become apparent from the following more detailed description, taken in conjunction with the accompanying drawings.

BRIEF DESCRIPTION OF THE DRAWINGS

FIG. 1 is simplified block diagram of a laser source in accordance with the invention;

FIG. 2 is a block diagram of a laser source in accordance with the invention, as used in conjunction with a PC MOPA (phase conjugated master oscillator power amplifier) configuration;

FIGS. 5a–5f depict the bandwidth of the laser source at various rf power levels.

DESCRIPTION OF THE PREFERRED EMBODIMENTS

Figure 3:
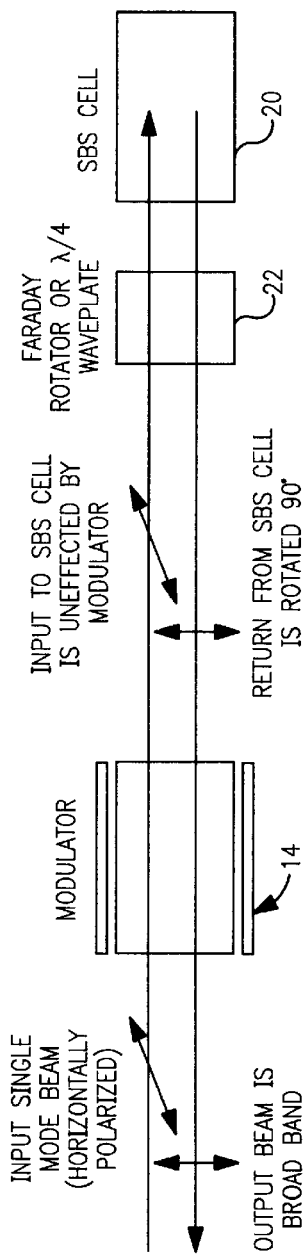
FIG. 3 is a block diagram of selected components of the laser source of FIG. 2, for purposes of explaining its operation.
Figure 4:
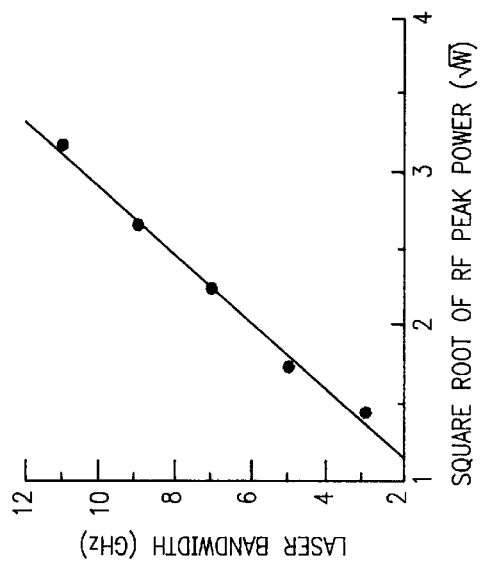
FIG. 4 is a graph showing the relationship between the bandwidth of the laser source and the modulator radio-frequency (rf) power.

As shown in the drawings for purposes of illustration, the present invention pertains to a broadband laser source. For many applications of lasers, a light beam that is coherent and monochromatic is desired. For other applications, a less coherent beam containing a broader band of frequencies is a requirement. The bandwidth of a light source is measured across the range of frequencies emitted by the source, and is often referred to symbolically as $\Delta\nu$. It is known that the frequency bandwidth of a transform limited pulse is approximately inversely proportional to the minimum temporal extent of the pulse $\Delta t$. Thus, $\Delta\nu \approx 1/\Delta t$. The coherence length $\Delta x$ is defined as $\Delta x = c\Delta t$, where $c$ is the velocity of light. Therefore, the bandwidth and coherence length are also inversely related, since $\Delta x = c\Delta t \approx c/\Delta\nu$.

Although phase modulation has been suggested in the past as a technique for broadening the bandwidth of a laser source, it has not been possible to provide a laser beam of high power and large aperture using this technique. In accordance with the invention, a laser source includes a single-mode master oscillator, indicated by reference numeral 10, an amplifier 12 and an electro-optical resonant modulator 14. The modulator 14 is positioned between the master oscillator 10 and the amplifier 12. A seeder 16 provides a high quality laser beam to the master oscillator 10, causing it to operate in a single mode and to produce a coherent output beam with a very narrow bandwidth. The modulator 14 provides large phase shifts with relatively low power and voltage input, and increases the bandwidth of the laser beam. The effective bandwidth is proportional to the phase shift per volt, $\beta$, the frequency of modulation, $\nu$, and the rf voltage (proportional to $\sqrt{P}$, where P is the power). More specifically, the bandwidth is given by:

$$\Delta\nu = \beta \cdot \nu \cdot \sqrt{P}.$$

The modulator 14 in the presently preferred embodiment of the invention is model no. 4421-C, manufactured by New Focus Inc. of Sunnyvale, Calif.

FIG. 2 shows how the invention is best used in conjunction with a PC MOPA (phase conjugated master oscillator power amplifier) configuration. In addition to the master oscillator 10, seeder 16, modulator 14 and amplifier 12, this configuration also includes an SBS (stimulated Brillouin scattering) cell 20, a Faraday rotator or quarter-wave ($\lambda/4$) plate 22, and a polarizer 24 for coupling energy out of the laser source. Light from the master oscillator 10 passes through the polarizer 24, then through the amplifier 12, before reaching the modulator 14. The electro-optical effect used in the modulator is very polarization dependent. The light beam from the master oscillator 10 is horizontally polarized, as indicated in FIG. 3, and is unaffected by the electro-optical modulator 14 when the beam is transmitted toward the SBS cell 20. Therefore, the beam impinging on the SBS cell 20 is still highly coherent. Almost certainly, the amplifier 12 causes phase aberrations in optical wavefronts of the beam as it passes through the amplifier medium. However, as is well known, phase conjugation may be used to cancel these aberrations by passing a phase-conjugated form of the beam back through the amplifier 12. The Faraday rotator or quarter-wave plate 22 causes a rotation of the direction of polarization, by a total of 90°, as a result of the forward and return passes of the beam. If a quarter-wave plate is used, on the forward pass the linear polarization is converted to circular polarization, and on the return pass the circular polarization is converted back to linear polarization, but with an orthogonal polarization direction. Therefore, the return beam is vertically polarized. If a Faraday rotator is used, the return beam is also vertically polarized in this example. The difference in polarization directions of the forward and return beams is used in conjunction with the polarizer 24, to outcouple the return beam from the PC MOPA configuration and to prevent the return beam from re-entering the master oscillator 10. In accordance with an important aspect of the invention, the modulator 14 is oriented such that the direction of linear polarization of the return beam is aligned with the electric field of the modulator. Electro-optical modulation then occurs only on the return path, and the beam that is output from the PC MOPA has a shorter coherence length and broader bandwidth than the original beam generated by the master oscillator 10.

It had previously been thought that the poor performance of SBS cells when exposed to broadband beams was due in part to lack of temporal smoothness (evidenced by "spiking") in the laser pulse waveform. The use of a resonant electro-optical modulator produces output pulses that are temporally smooth, but these still had an adverse effect on SBS cell performance when the modulator was placed next to the SBS cell 20. It appears that the poor performance arises whenever the input beam has a broad bandwidth, regardless of temporal smoothness. Positioning the modulator 14 such that only the return beam is modulated, ensures that SBS cell performance is not affected by the presence of the modulator.

The resonant electro-optical modulator 14 can be conveniently controlled to achieve a desired bandwidth and number of modes. The modulator 14 uses a nonlinear material, such as lithium niobate or lithium tantalate, in a resonant rf cavity to enhance the driving fields and the amount of phase modulation achieved. The frequency separation of the first pair of sidebands from the carrier wave is the same as the resonant rf frequency. Thus, if the driving rf field has a frequency of 1 GHz, the sidebands are at a frequency of ±1 GHz from the carrier frequency. By driving the modulator 14 to progressively higher voltages, one can introduce higher order sidebands separated from the carrier frequency by multiples of the rf frequency. In the case of the 1 GHz rf signal, the sidebands would be at ±1 GHz, ±2 GHz, ±3 GHz, and so forth, with respect to the carrier frequency. At higher drive voltages, the resulting frequency spectrum has characteristics similar to those of a multimode broadband laser source, as indicated in FIG. 5f, with the exception that, unlike a multimode laser beam, the laser pulses output from the laser source of the invention are temporally smooth. Therefore, it will be seen that the bandwidth and number of modes are increased when the modulator drive voltage is increased.

FIG. 5a shows the relatively narrow bandwidth of the laser output without any modulation signal (rf power=0). FIG. 5b shows the effect of a 2 watt modulating rf signal, with the bandwidth increased to 3 GHz. As shown in FIGS. 5c–5f, when the modulator rf power is increased to 3, 5, 7 and 10 watts, the bandwidth is seen as increasing to 5, 7, 9 and 11 GHz, respectively.

The number of modes of operation can also be controlled independently of the bandwidth, by adding one or more additional modulators (not shown) in series with the modulator 14. For example, a second modulator operating at a resonant rf frequency of 0.3 GHz could be used to generate sidebands at multiples of ±0.3 GHz. In this way, the number of modes can be further increased without affecting the overall bandwidth of the output laser beam.

It will be appreciated from the foregoing that the present invention represents a significant advance in the field of high power laser sources for applications having a need for low coherence length, i.e. broad bandwidth output characteristics. In particular, the present invention provides a high power, large aperture, pulsed output beam of low coherence length and broad bandwidth, each pulse being temporally smooth. Moreover, the bandwidth and number of modes of oscillation can be varied to meet specific application requirements. It will also be appreciated that, although specific embodiments of the invention have been described for purposes of illustration, various modifications may be made without departing from the spirit and scope of the invention. Accordingly, the invention should not be limited except as by the appended claims.

We claim:

1. A laser source having a broad bandwidth, comprising:

a master oscillator providing a single-mode laser beam at a nominal frequency;

a resonant electro-optical modulator positioned to receive the laser beam; and a source of radio-frequency (rf) modulation voltage coupled to the modulator;

wherein the modulator produces an output beam having sidebands spaced on each side of the nominal frequency, and having a lower coherence length than the single-mode laser beam.

2. A laser source as defined in claim 1, and further comprising:

an amplifier positioned in the path of the output beam, to amplify the energy of the output beam.

3. A laser source as defined in claim 1, wherein:

the source of rf modulation voltage is adjustable to vary the number of sidebands and overall bandwidth of the output beam.

4. A laser source as defined in claim 3, and further comprising:

at least one additional electro-optical modulator connected optically in series with the first-recited modulator; and at least one additional source of rf modulation voltage connected to the at least one additional electro-optical modulator and having a frequency less than that of the first-recited source of rf modulation voltage, whereby the at least one additional electro-optical modulator provides additional sidebands at smaller frequency intervals than those provided by the first-recited modulator.

5. A broadband high power laser source, comprising:

a master oscillator providing a single-mode laser beam at a nominal frequency and with a linear polarization direction;

an amplifier positioned to receive and amplify the laser beam from the master oscillator;

a resonant electro-optical modulator positioned to receive the amplified laser beam;

a source of radio-frequency (rf) modulation voltage coupled to the modulator;

a phase conjugation device positioned to receive the amplified laser beam and reflect it in phase conjugated form;

optical means positioned between the modulator and the phase conjugation device, for rotating the direction of polarization by 90° as a result of two passes of the laser beam; and a polarizer positioned between the master oscillator and the amplifier, to outcouple the return beam from the laser source;

wherein the modulator is oriented to be effective in modulating the beam only on its return pass, and wherein the modulator produces an output beam having sidebands spaced on each side of the nominal frequency, and having a lower coherence length than the single-mode laser beam.

6. A broadband high power laser source as defined in claim 5, wherein:

the optical means includes a quarter-wave plate, for converting the linearly polarized laser beam on its first pass to a circularly polarized beam, and for converting the circularly polarized beam back into a linearly polarized beam on the return pass.

7. A broadband high power laser source as defined in claims 6, wherein:

the source of rf modulation voltage is adjustable to provide a selected bandwidth for the output beam.

8. A broadband high power laser source as defined in claims 6, and further comprising:

at least one additional electro-optical modulator connected optically in series with the first-recited modulator; and at least one additional source of rf modulation voltage connected to the at least one additional electro-optical modulator and having a frequency less than that of the first-recited source of rf modulation voltage, whereby the at least one additional electro-optical modulator provides additional sidebands at smaller frequency intervals than those provided by the first-recited modulator.

* * * * *